United States Patent [19]

Heitmann

[11] Patent Number: 4,555,737
[45] Date of Patent: Nov. 26, 1985

[54] METHOD OF PROVIDING SMOOTH TRANSITION FROM ONE TO ANOTHER OF TWO SEQUENCES OF DIGITALLY CODED SOUND SIGNALS (FADING)

[75] Inventor: Jürgen Heitmann, Alsbach-Hähnlein, Fed. Rep. of Germany

[73] Assignee: Robert Bosch GmbH, Stuttgart, Fed. Rep. of Germany

[21] Appl. No.: 530,114

[22] Filed: Sep. 7, 1983

[30] Foreign Application Priority Data

Sep. 8, 1982 [DE] Fed. Rep. of Germany ....... 3233287

[51] Int. Cl.⁴ .............................................. G11B 27/02
[52] U.S. Cl. ..................................... 360/13; 360/14.1
[58] Field of Search .......................... 360/13, 14, 32, 38

[56] References Cited

U.S. PATENT DOCUMENTS 4,327,382  4/1982  Tanaka ................................... 360/13
4,423,441  12/1983 Ozaki et al. ........................... 360/13
4,473,850  9/1984  Foerster et al. ....................... 360/32

Primary Examiner—Vincent P. Canney
Attorney, Agent, or Firm—Frishauf, Holtz, Goodman & Woodward

[57] ABSTRACT

Sudden changes in loudness of the sound signal between successive television scenes are avoided by substituting faded transitions between the sound signals of successive scenes instead of simple abutment of sound signal sequences one behind the other. This is produced, in a system in which the sound signals are digitally encoded, by distributing digital sound signal samples individually or by pairs to two recording channels in alternation and providing the transitions from the sound signals of one scene to the sound signal of the next scene earlier in one channel than in the other, by about 10 milliseconds. During that time span, one signal is faded out and the other is faded in by digital filtering or multiplication. It is convenient to provide such a reciprocal fading operation for the sound signals between each picture field or at least between each picture frame. During the reciprocal fading intervals, the sound signal samples of each sequence may be filled in with interpolated sample values inserted at the same time that a sample value of the other sequence is provided in the other channel. The provision of continuous forming of interpolated values can be used for substitution of interpolated values for sample values of a signal that has dropped out or been subjected to errors by disturbances.

4 Claims, 5 Drawing Figures

METHOD OF PROVIDING SMOOTH TRANSITION FROM ONE TO ANOTHER OF TWO SEQUENCES OF DIGITALLY CODED SOUND SIGNALS (FADING)

This invention concerns providing smooth transitions between digitally coded sound signal sequences relating to successive events or scenes, particularly in the case of television sound signals. Such transitions are referred to as "faded" meaning that one signal is faded out while the other is faded in as is common in television and sound program practice.

It is known that when sound signal sequences are simply made to follow each other without any effort at fading, and then sound is then reproduced from the signal stream, effects that are disturbing for the listener's ears occur as the result of sudden differences in loudness or as the result of crackling sounds at the transition. In consequence, every cut-over from scene to scene should in principle incorporate a faded transition over some prescribed time interval.

Moreover, in procedures for processing digitally coded signals in which it is necessary to write the signals into a store, from which they are read out and can be mixed with other signals, with every generation of this type of operation a growing time offset takes place between the picture signals and corresponding sound signals, and this for two reasons.

In the first place there is a time offset that results from the spacing between the magnetic heads used for reading and writing. Data are first read from a particular track of the magnetic tape and then the track in question is erased by an erase head arranged to follow in the track direction or, again, there may be no immediate erasing, but the track is overwritten by a recording magnetic head. In the second place the successive bits of a data word must be picked up in before the data word can be evaluated and processed whenever digitally coded signals that are serially recorded are processed.

PRIOR ART

A method for cutting and assembling digitally recorded low-frequency signals from separate channels of a recording medium to produce a combined or compound low-frequency signal is disclosed in published German patent application (OS) No. 29 44 405. In that disclosure preliminary beginning and end point words for a cut are provided and the desired sections are recognized therefrom. Then a multiplicity of signal data words from the neighborhood of the preliminary cut points are stored and the average power content of these stored data words is indicated. Finally, on the basis of these indications the final cut point words are selected and the switchover is made between them. This known process requires a great deal of care by those operating it and requires storage and indicating devices for displaying the power content of the stored signal data.

A method of fitting together two digitally coded signal sections, particularly with audio information, which is free of disturbing signals, is known from German published patent application (OS) No. 29 12 481, in which method the two signal sections to be connected together are likewise preliminarily sampled in the region of the intended cut or fade-over and then their pulse sequences are each introduced into an intermediate store, after which a cut-over point free of disturbing signals is found by controllable circulation of the store contents in frequency and direction. This method also in operation requires intermediate stores for holding the pulse sequences picked out of the neighborhood of the contemplated cut-over location.

An editing circuit is provided in a PCM sound reproduction apparatus described in German published patent application (OS) No. 30 32 673. In this case the PCM signal trains are spread out over the contemplated cut-over point by means of delays. The PCM signals are alternately completed with correction signals and then the output signals of the first PCM pulse train is brought, by means of multiplication circuits, from a large significance X1 to a small significance X0 while the data of the second PCM pulse trains is brought up from the small significance X0 to a high significance X1. As a result the signals characterized by the first PCM pulse train are faded out in the region of the cut-over point and those characterized by the second PCM pulse train are faded in over the same region of the cut-over point.

SUMMARY OF THE INVENTION

It is an object of the present invention to provide a method by which picture-synchronous sound signals can be faded over in discrete intervals, preferably in the region between television picture fields or frames, and to make this possible without intermediate storage.

Briefly, pairs of sample values are alternately distributed among at least two recording channels, the transition from the sample values of a first sound signal to those of a second sound signal takes place at difference instants in the respective channels, and moreover, within the splicing interval defined by the actual transitions the significance the data of the signal section to be faded out are modified from a nominal value down to a minimum value and the significance of the data of the signal section to be faded in are modifrom a minimal value up to nominal value.

More significantly yet, the sound signals of successive scenes—even of successive picture fields—are similarly faded together in the aforesaid manner quite regularly, so that any vertical picture blanking interval provides an available cut-over point for future splicing and editing. These preparations can advantageously be made at the earliest recording stage—even in an original videotape sound/picture live pick-up.

The invention has the advantage that in the region of every possible cut-over point the signals of both PCM pulse trains are made available both before and after the cut, without any increased quantity of data from some undue requirement of double recording. There is the further advantage that neither delay schemes nor storage devices are needed for holding the data in the region of the contemplated cut-over points.

As a further development of the invention it is useful to assemble sequences of sound signals for successive picture events at the earliest recording stage, the fading process being used for assembling the final recording in the editing process.

BRIEF DESCRIPTION OF THE DRAWINGS

The invention is further described by way of illustrative example with reference to the annexed drawings, in which.

DESCRIPTION OF THE PREFERRED EMBODIMENTS

Figure 1:
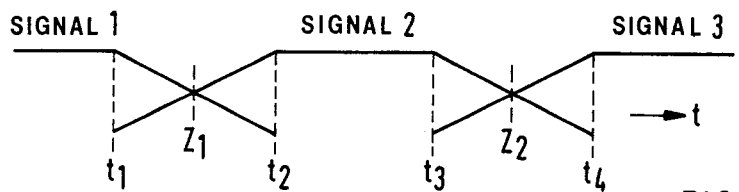
FIG. 1 is a diagram of the time course of signal values where reciprocal fading is used for sound related to successive picture fields.

FIG. 1 shows a desired course of average sound signal amplitude of a television signal sequence after its reconversion from digital into analog form. Prior to the instant t, between $t_2$ and $t_3$ and after $t_4$ the amplitude is of "nominal value", meaning that it conforms to the full digitally coded values of the successive signal samples, no more and no less. Beginning at the instant $t_1$ the amplitude of the signal 1 falls off until at the instant $t_2$ it reaches the lowest value (in general the value 0). At the same time the amplitude of the signal 2 increases from the instant $t_1$ from its smallest value and at the instant $t_2$ has reached the full nominal value. FIG. 1 illustrates the simultaneous fading out of the signal 1 and the fading in of the signal 2 to provide a reciprocally faded transmission from one to the other which is symmetrical to the desired cut-over instant $Z_1$. In the same manner the amplitude of the signal 2 has a downward course from the instant $t_3$ on until it reaches the smallest value at the instant $t_4$, while the signal 3 rises in the time span from $t_3$ to $t_4$ to its nominal value. The fading period again is symmetrical with respect to the cut-over instant $Z_2$.

For obtaining in practice the desired amplitude courses schematically shown in FIG. 1, for example for sound signals belonging to video events, these sound signals are recorded in digitally coded form in two channels. The selection of sample values from the respective sequences belonging to two scenes for the two channels are so offset in time with respect to each other that those belonging to a particular television field (half frame) are still available for a while after a cut-over instant, corresponding to a place where the record (e.g. on tape) could be conveniently cut, such an instant being, for example, between the first and second field, and, likewise, the sample values of the new sample signals belonging to the second field are already available in the second channel $k_2$ during a certain period of time while the old scene is still running. For example, the time offsets of the two sound signal cut-overs may be 5 milliseconds positive in the channel $k_1$ and 5 milliseconds negative in the channel $k_2$, so that there results a fading interval of 10 milliseconds for the cut-over in the comprehensive channel $k_3$, which represents what occurs in sound reproduction when signals picked up from the two recording channels $k_1$ and $k_2$ are combined.

Figure 2:
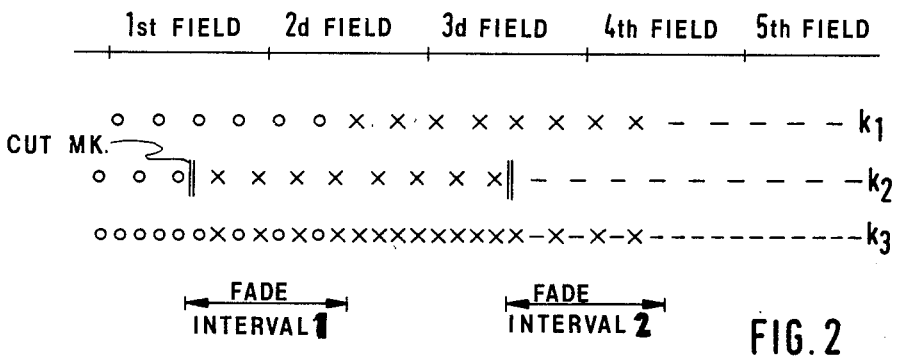
FIG. 2 schematically shows the distribution of data words (sample values) between two channels for carrying out the fading method to which FIG. 1 refers.
Figure 3:
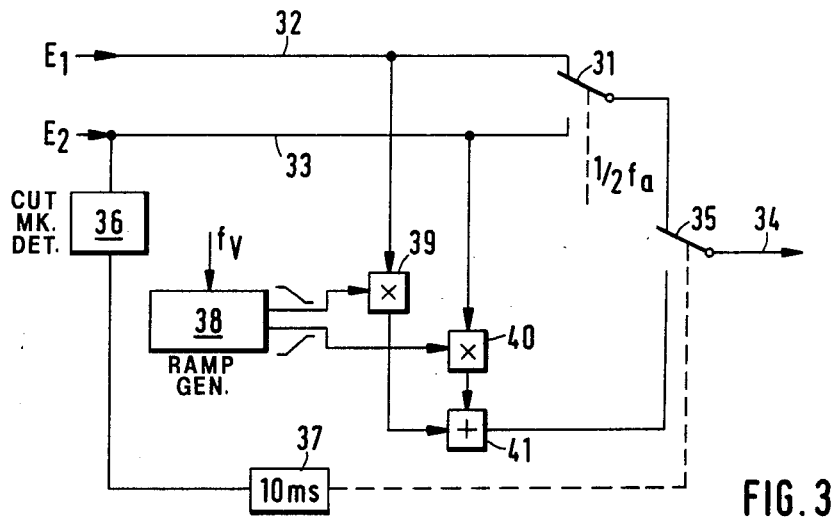
FIG. 3 is a block circuit diagram of an embodiment of a circuit for carrying out the method of the invention.

As is evident in the representation of the values in the comprehensive channel $k_3$, these are composed alternatively of sample values of the channels $k_1$ and $k_2$. Thus, during the fading interval 1 the sample values from signal 1 and from signal 2 alternate and during the fading interval 2 the sample values of signal 2 and signal 3 alternate. It is also possible within the scope of this invention, of course, to record the signal represented as $k_3$ and to reproduce it from that record rather than from $k_1$ and $k_2$. This is what is shown by FIG. 3, where the output line 34 corresponds to $k_3$. Since, as shown in FIG. 2, the samples in $k_1$ and $k_2$ are interleaved rather than concurrent, the adder 41 would add zero to in each case in the absence of delays and in principle a simple superposition circuit or another switch operating at the frequency $f_a/2$ could be substituted.

In the circuit of FIG. 3 the sample values from the channel $k_1$ and from the channel $k_2$ are supplied to the respective inputs $E_1$ and $E_2$. A transfer switch 31 is operated at half the sampling frequency and obtains from the lines 32 and 33 the alternatingly appearing sample values and puts them together into a continuous data stream which is obtainable at the output 34. A second transfer switch 35 is normally, i.e. when no cut-over or fading takes place, in the position shown in FIG. 3. In the case of a cut-over a mark detector 36 at the input $E_2$ recognizes cut mark signals in channel k, shown in FIG. 2 by parallel lines. When such a cut mark occurs, the detector 36 switches in a monostable multivibrator 37 for the desired fading interval, in the present case 10 milliseconds, as the result of which the transfer switch 35 is put into its second position, not shown in the drawing, for this interval. A ramp generator 38 continuously controls, in step with the picture field frequency V, the two digitial multipliers 39, 40 in such a way that their multiplication factors change oppositely between maximum and minimum beginning and end values during 10 milliseconds. The multiplication factor of the digital multiplier 39 therefore is changed from the value 1.0 to 0.0 and the multiplication factor of the digital multiplier 40 from the value 0.0 to 1.0. The sample values applied at the input of the digital multiplier 39 by the line 32 are consequently changed in their significance for the duration of 10 milliseconds in the sense of a diminution, while the signals at the input of the digital multiplier 40 from the line 33 are at the same time modified in the sense of an increase in their significance. The thus modified signals at the outputs of the digital multipliers 30, 39 and 40 are supplied to the respective inputs of a digital adder 41, since for the duration of the activation of the monostable multivibrator 37 the switch 35 connects the output of the adder 41 with the overall output 34 of the circuit and supplies the output of the adder 41 as the total signal.

Figure 4:
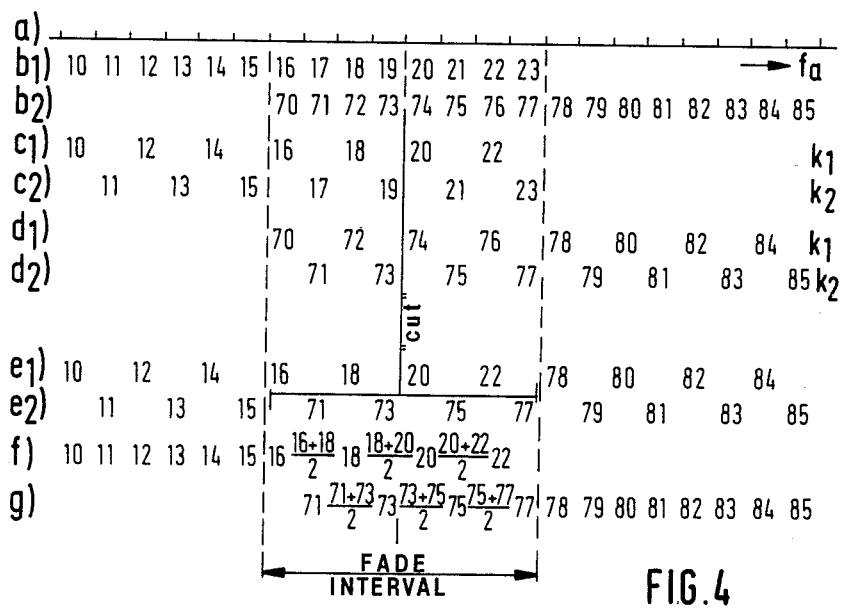
FIG. 4 shows the time sequence of the sample values in two channels in a period including a fading transition interval, with the addition of interpolated sample values in that interval.

FIG. 4 shows a sampling scheme for explanation of another illustrative example of the method of the invention for fading digitally-coded sound signals. Line (a) at the top of the diagram shows cycle intervals of the sampling frequency $f_a$. The next two lines, respectively $(b_1)$ and $(b_2)$ show the sequence order numbers of two sets of samples. The samples having the order numbers 10–23 belong to a first sound event and are originally found in a first channel, corresponding to a first picture scene picked up by a picture camera, while the sample values having order numbers beginning with 70 belong to the next sound event related to the following picture scene picked up by the same or a different camera and are originally found in a second channel.

The (imaginary) "cut" between the scenes sould be found between the sample values 19 and 20 and likewise between the sample values 73 and 74. In recording on magnetic tape the sample values of each sound event are alternately allocated between two recording channels $k_1$ and $k_2$. In consequence the channel $k_1$ (lines $c_1$ and $d_1$ of FIG. 4) always receive even-numbered samples and the channels $k_2$ ( lines $c_2$ and $d_2$) the odd-numbered sample values. In the region of the contemplated cutover the transition from the data of the first sound event to the data of the second sound event takes place in channel $k_1$, as shown in line ($e_1$) of FIG. 4 at a later time than in channel $k_2$, as diagrammed in line ($e_2$) of FIG. 4. The cut-over transitions in both channels are advantageously offset by equal amounts of time respectively before and after the (imaginary) "cut" instant. In the given example the fading interval extends from the sample value 16 in channel $k_1$ over to the sample value 77 in channel $k_2$.

Figure 5:
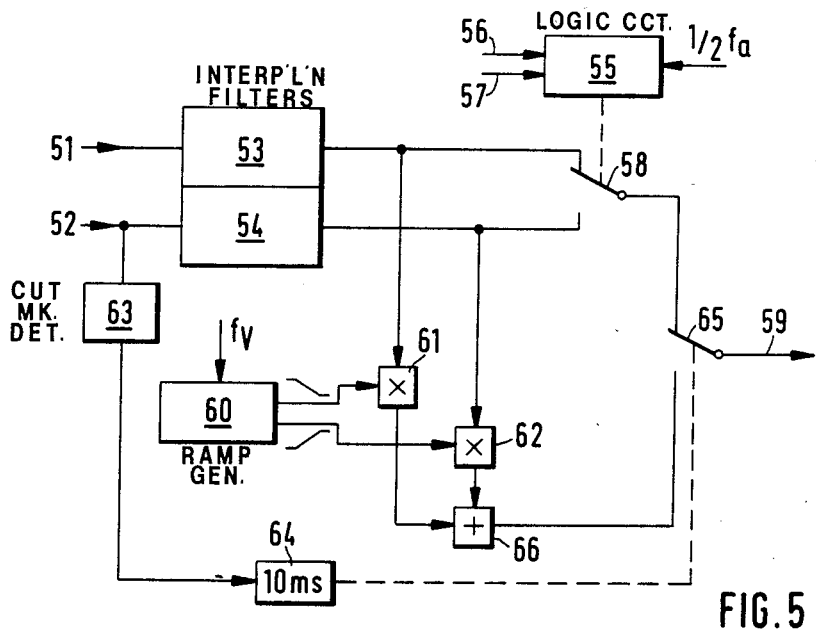
FIG. 5 is a block circuit diagram apparatus for carrying out a fading operation in accordance with FIG. 4.

In carrying out a fading operation the sample values that are missing are inserted by interpolation between the undisturbed values of each channel by means of the circuit schematically shown in FIG. 5. This interpolation is not limited to the duration of the fading interval, and even random disturbances in a channel can thereby be bridged over in this manner. For the fading operation only interpolation between the even-numbered samples of one sequence and between the odd-numbered samples of the other sequence are strictly necessary. As shown in lines (f) and (g) of FIG. 4 the missing sample values are completed by averaging the samples 16 and 18, likewise the samples 18 and 20 and also the samples 20 and 22 of the first sound event and by averaging the samples 71 and 73, likewise 73 and 75 and finally 75 and 77 of the second tone event, simple averaging being a convenient form of interpolation.

For carrying out the operations in the preferred manner shown in FIG. 4, digital interpolation filters 53 and 54 are interposed at the inputs 51 and 52 of the circuit of FIG. 5, where they continuously complete the presented data by interpolation at half the sample frequency. So long as the logic circuit 55 at its inputs 56 and 57 holds no information regarding data errors in the data sequences at the inputs 51 and 52, the transfer switch 58 is switched over at the frequency $f_a/2$ and the data of change by interpolation remains disregarded. In the case of a disturbance, for example in the data stream present at the input 52, an error signal appears at the input 57 of the logic circuit 55 which interrupts the switching over of the transfer switch 58. For the duration of the error the transfer switch remains in its position for receiving data from the undisturbed channel. In this case, therefore, the intermediate values calculated by the digital interpolation filter 53 are supplied in alternation with the original data of the channel to the output 59.

A ramp generator 60 for cooperation with the digital multipliers 61 and 62 is provided in the same way and with the same functions for carrying out the fading operation. By means of the digital multipliers 61 and 62 having control lines connected to the ramp generator 60, the significance of the sample values obtained from the outputs of the digital interpolation filters 53 and 54 are modified in opposite senses between a minimum value and a maximum value. For the duration of the fading interval lasting, for example for 10 ms after the appearance of a cut mark at the input 52 and the recognition thereof by the cut mark detector 63, the monostable multivibrator 64 is activated and the transfer switch 65 is put into its second (not shown) switch position for the duration of the fading intervals. In this manner the sample values are modified in their significance and then combined in the adder 66, after which they are connected through to the output 59.

It is to be understood that the ramp generators 38 and 60 will conveniently be digital devices operated in microstep with the sampling frequency as well as in step with the vertical television scanning frequency, to produce appropriately stepped digital outputs.

When scenes from different cameras are being spliced, the sound signals relating to the respective scenes will usually be available in different channels originally and the procedure of the invention will simply be one of distributing the signals from the first such original channel into two recording channels $k_1$ and $k_2$ until the end of the splice and beginning the distribution from the first such original channel into between the two recording channels as above described from the time of the beginning of the splice and continuing after the fading interval is complete (the end of the splice). As indicated in FIG. 1, however, fading intervals for the second signal between picture fields televised by the same camera may advantageously be regularly provided during the vertical scanning gaps of the video signal. For this purpose, since an overlap of sound signals is desired it may be useful for the picked up sound to be put into two channels utilized alternately with an overlap during the vertical scanning interval. When this is done with all cameras used, it is then easy to splice the television signals of two different cameras and to provide the audio fading in the same way as is provided from scene to scene with the use of a single camera.

As for the cut marks provided for recognition by the circuit 36 of FIG. 3, they may be provided in any of a number of ways, including, for example, the provision of an otherwise forbidden code in the digital sample values.

Although the invention has been described with reference to particular illustrative examples, it will be recognized that variations and modifications are possible within the inventive concept. Thus, when each sample of an audio signal is represented as a pair of samples in two different tracks, successions of such sample pairs can be processed in the manner described above for successive samples.

I claim:

1. Method for disturbance-free slicing together first and second digitally coded signal sequences representing sound corresponding respectively to first and second television scenes in a manner providing freedom of choice of television cut-over point even after trial splicing at a previously selected cut-over point, comprising the steps of:

distributing successive coded signal samples of each of said sequences alternately between at least first and second recording channels for subsequent recording;

making a transition in each of said recording channels regarding signal samples available thereto from samples of said first sequence to samples of said second sequence in such a way that said transition occurs in said first recording channel before the transition occurs in said second recording channel and the time span between said respective transitions in said first and second channels extends over a multiplicity of sampling intervals of said signal sequences;

modifying the values of said coded samples during said time span by progressively reducing the successive samples of said first sequence from a nominal to a minimum value and reducing the values of the successive samples of said second sequence by a progressively declining reduction factor so that during said time span said samples of said second sequence progessively increase from a minimum value to a nominal value;

forming, during said time span, interplated-value sample value signals between each of the successive samples, of both said first and second sequences, respectively distributed to said first and second channels;

inserting said interpolated value sample signals between successive sample value signals of the sequence in the channel to which said sample values are distributed, and in the reproduction of the signals from said recording channels, combining the signals to the two recording channels to provide the basis of a reproduced sound signal, the combination being performed with averaging of said interpolated values with the contemporary values of the other sequence participating in the splicing method during each said time span.

2. Method according to claim 1 in which, in the case of signal sample deficiencies in one of said recording channels, additional method steps are performed to substitute interpolated-value samples in place of deficient samples, including the step of continuously making available replacement samples for at least every alternate sample of a sequence by digital interpolation or digital filtering of non-deficient samples of the same sample sequence.

3. Method according to claim 1, in which the step of distributing successive coded signal samples of each of said sequences alternately between at least first and second recording channels for subsequent recording is continuously performed the signals of all scenes originally recorded at least during all portions of said scenes which might conceivably be cut for splicing and in which the transition from a sequence representing a first scene to a sequence representing the next scene takes place in said first channel at a time preceding the said transition in said second channel by an interval of the order of magnitude of 10 milliseconds.

4. Method according to claim 3, in which the further step is performed of providing a cut mark signal in said first channel to identify said making of said transition therein.

* * * * *